US012709395B2

(12) United States Patent
Cominsky

(10) Patent No.: US 12,709,395 B2
(45) Date of Patent: Aug. 18, 2026

(54) SYSTEM AND METHOD FOR SECURING A SEAT ASSEMBLY TO SEAT TRACKS WITHIN AN INTERNAL CABIN OF A VEHICLE

(71) Applicant: THE BOEING COMPANY, Arlington, VA (US)

(72) Inventor: Kenneth D. Cominsky, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 125 days.

(21) Appl. No.: 18/769,509

(22) Filed: Jul. 11, 2024

(65) Prior Publication Data

US 2026/0015086 A1 Jan. 15, 2026

(51) Int. Cl.
*B64D 11/06* (2006.01)

(52) U.S. Cl.
CPC ...... *B64D 11/0696* (2013.01); *B64D 11/0691* (2014.12)

(58) Field of Classification Search
CPC ........................ B64D 11/0696; B64D 11/0691
USPC ........................................................ 248/503.1
See application file for complete search history.

(56) References Cited

U.S. PATENT DOCUMENTS 8,444,359 B2 * 5/2013 Grether ..................... B64C 1/20 29/525.02
11,072,412 B2 7/2021 Jang et al.
2014/0064827 A1 * 3/2014 Korenromp ............ B64D 11/00 403/63
2018/0134368 A1 5/2018 Cullen

FOREIGN PATENT DOCUMENTS

WO WO 2016/091907 6/2016

OTHER PUBLICATIONS

Extended European Search Report for EP App. No. 25172766.5-1009, dated Jun. 24, 2025.

* cited by examiner

*Primary Examiner* — Anita M King
(74) *Attorney, Agent, or Firm* — Joseph M. Butscher; Carroll, Hoette & Butscher, LLC

(57) ABSTRACT

A system includes an intercostal configured to secure to a first seat track and a second seat track. The intercostal includes one or more attachment bosses configured to secure to one or more feet of a base of a seat assembly. A method includes securing an intercostal to a first seat track and a second seat track, and securing one or more feet of a base of a seat assembly to one or more attachment bosses of the intercostal.

20 Claims, 9 Drawing Sheets

200
210
218
228
234
214
228
202
230
204
212
206
262
260
208
226
220
222
234
224
214
222
210
216

200
218
210
240
242
222
224
234
222
214a
220
246
212
202
262
206
248
204
260
264
244
266
264
214b
234
216
210
226

216
270
214b
220
226
208
206
204
260
202
200
230
228
214a
220
228
218

214
216
262
208
226
222
210
260

306
306
306
214b
200
302
303
203
300
201
304
214a
301

SYSTEM AND METHOD FOR SECURING A SEAT ASSEMBLY TO SEAT TRACKS WITHIN AN INTERNAL CABIN OF A VEHICLE

FIELD OF THE DISCLOSURE

Examples of the present disclosure generally relate to a system and a method for securing a seat assembly, such as a flight attendant seat assembly, to seat tracks within an internal cabin of a vehicle, such as a commercial aircraft.

BACKGROUND OF THE DISCLOSURE

Vehicles such as commercial aircraft are used to transport passengers between various locations. A typical aircraft includes an internal cabin having seats for passengers.

Passenger seats within an internal cabin are typically secured to parallel seat tracks. In particular, a passenger seat has a base including feet that secure to the seat tracks.

An internal cabin of a commercial aircraft also includes flight attendant seats, which can be located proximate to an egress door. A flight attendant seat also includes a base having feet that are secured to parallel seat tracks through specialized attachment fittings.

Currently, flight attendant seats can only be attached at certain locations in an internal cabin using seat tracks in the floor. Any attempt to locate a seat away from existing seat tracks typically requires one or two new seat tracks for the flight attendant seats. However, space for such specialized seat tracks is limited. Further, installing such specialized seat tracks can be technically challenging and expensive. As an example, if a flight attendant seat is to be shifted a relatively short distance (such as less than 6 inches) either right or left from an existing seat track, a specialized seat track may need to occupy space of an existing seat track. However, spacing between one of the specialized seat tracks and the existing seat track may not have the required spacing to accommodate the flight attendant seat assembly.

Also, hardware used to secure a foot of a seat track assembly is typically complex. For example, an attachment fitting includes a specialized connector having two studs, which are spaced apart to fit into two reciprocal openings of a seat track. A fastener, such as a bolt is secured to the connector, such as through a lower nut. After the fastener is secured to the connector, a specialized shroud fits over the connector, with the fastener extending upwardly through the top of the shroud. The shroud includes tabs that fit into reciprocal channels of the connector. The shroud is also sized and shaped to fit into an opening of a foot of a base of the flight attendant seat. After the resulting assembly is secured to the foot, a bracket of the flight attendant seat is fit over the exposed portion of the fastener, and an upper nut is secured over a top of the bracket onto the fastener.

SUMMARY OF THE DISCLOSURE

A need exists for an effective and efficient system and method for securing a seat within an internal cabin of a vehicle, such as a commercial aircraft. Further, a need exists for a system and a method for allowing seat assemblies, such as flight attendant seat assemblies, to be efficiently shifted away from existing seat tracks. Also, a need exists for a less complex system for securing a fitting of a flight attendant seat assembly to a seat track. Also, a need exists for a system and method for securing a fitting of a flight attendant seat assembly to a seat track without impacting the design of the flight attendant seat assembly.

With those needs in mind, certain examples of the present disclosure provide a system including an intercostal configured to secure to a first seat track and a second seat track. The intercostal includes one or more attachment bosses configured to secure to one or more feet of a base of a seat assembly.

In at least one example, the seat assembly is a flight attendant seat assembly within an internal cabin of an aircraft.

In at least one example, the one or more attachment bosses include a first attachment boss proximate to a first end of a main beam of the intercostal, and a second attachment boss proximate to a second end of the main beam of the intercostal. The first end is opposite from the second end.

In at least one example, the one or more attachment bosses include a channel. A bushing is retained within the channel. As a further example, the bushing is configured to threadably retain a fastener.

In at least one example, the intercostal includes one more first passages configured to align with one or more first openings of the first seat track. One or more first fasteners are configured to extend through the one or more first passages and the one or more openings to secure the intercostal to the first seat track. One or more second passages are configured to align with one or more second openings of the second seat track. One or more second fasteners are configured to extend through the one or more second passages and the one or more second openings to secure the intercostal to the first seat track. In at least one example, the one or more attachment bosses are offset from the one or more first passages and the one or more second passages. As a further example, the intercostal also includes one or more third passages configured to align with the one or more first openings or one or more third openings of the first seat track.

In at least one example, the intercostal also includes one or more panel supports extending outwardly from a lower surface of a main beam. For example, a first panel support extends forwardly from the lower surface, and a second panel support extends rearwardly from the lower surface.

In at least one example, the one or more attachment bosses are configured to be retained within a retaining channel of a collar of the one or more feet.

The seat assembly can include one or more securing brackets that are configured to be fastened to the one or more attachment bosses.

Certain examples of the present disclosure provide a method including securing an intercostal to a first seat track and a second seat track, and securing one or more feet of a base of a seat assembly to one or more attachment bosses of the intercostal.

Certain examples of the present disclosure provide an aircraft including an internal cabin having a first seat track and a second seat track on a floor. An intercostal is secured to the first seat track and the second seat track. The intercostal includes one or more attachment bosses. A flight attendant seat assembly includes a base having one or more feet. The one or more feet are secured to the one or more attachment bosses.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain examples of the present disclosure provide a system and a method for securing a seat assembly, such as a flight attendant seat assembly, within an internal cabin of a vehicle, such as a commercial aircraft. The system and method include an intercostal with bosses configured to match existing seat attachments which are configured to secure to feet of a base to seat tracks. The bosses do not need to be aligned over seat tracks, thereby enabling desired positioning of flight attendant seats and additional payload arrangements within the internal cabin without the need for new seat tracks or flight attendant seat redesign.

In at least one example, the bosses of the intercostal are sized and shaped to match corresponding sizes and shapes of known flight attendant seat attachment hardware. In this manner, the systems and methods described herein preserve a seat interface and loads, while simultaneously allowing for adaptable positioning relative to existing seat track locations. Examples of the present disclosure allow for increased options for locations of flight attendant seating arrangements, which can further allow for additional passenger seating within the internal cabin.

Figure 1:
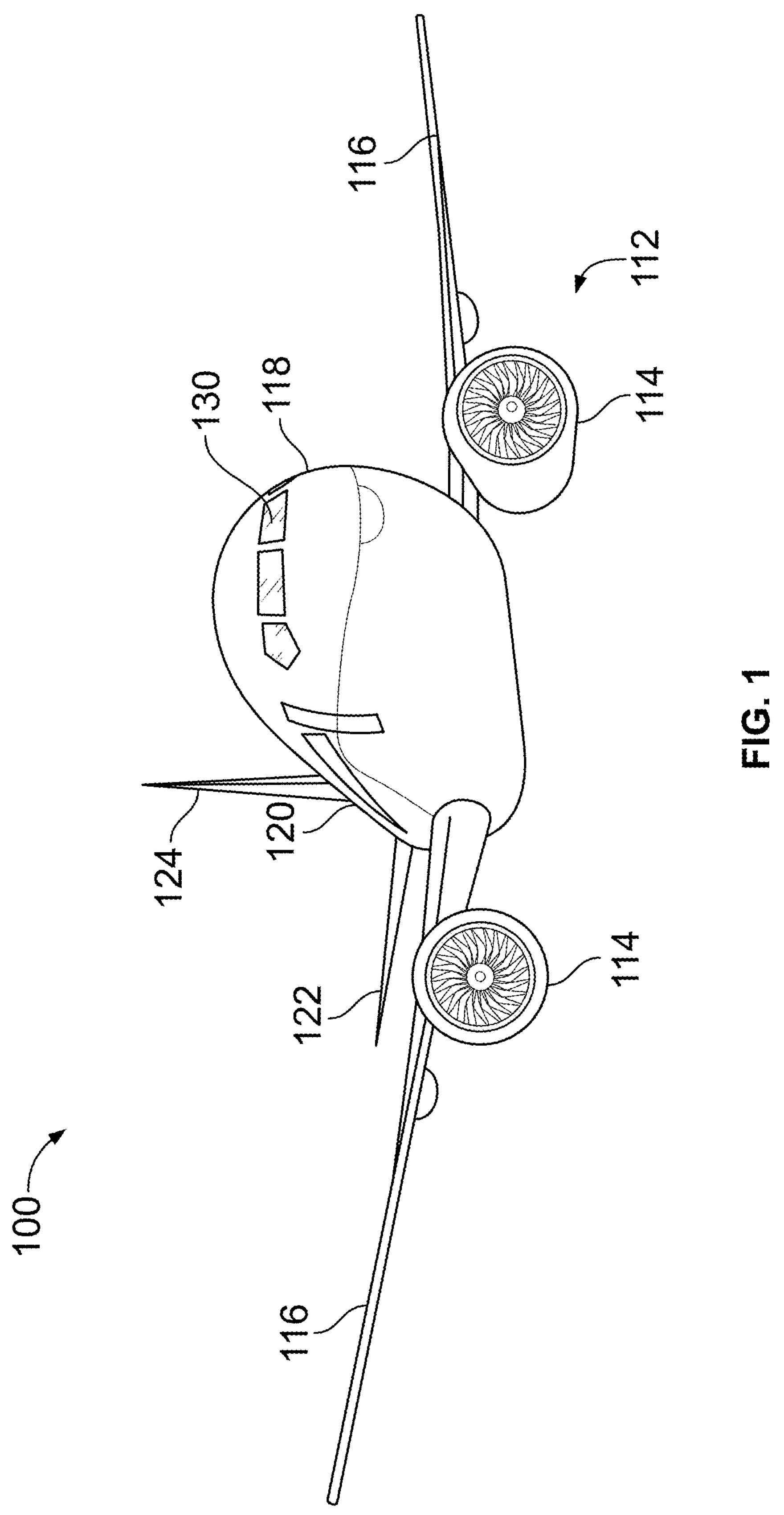
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 having engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124.

The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, examples of the present disclosure may be used with various other vehicles, such as automobiles, buses, locomotives and train cars, watercraft, spacecraft, and the like.

Figure 2:
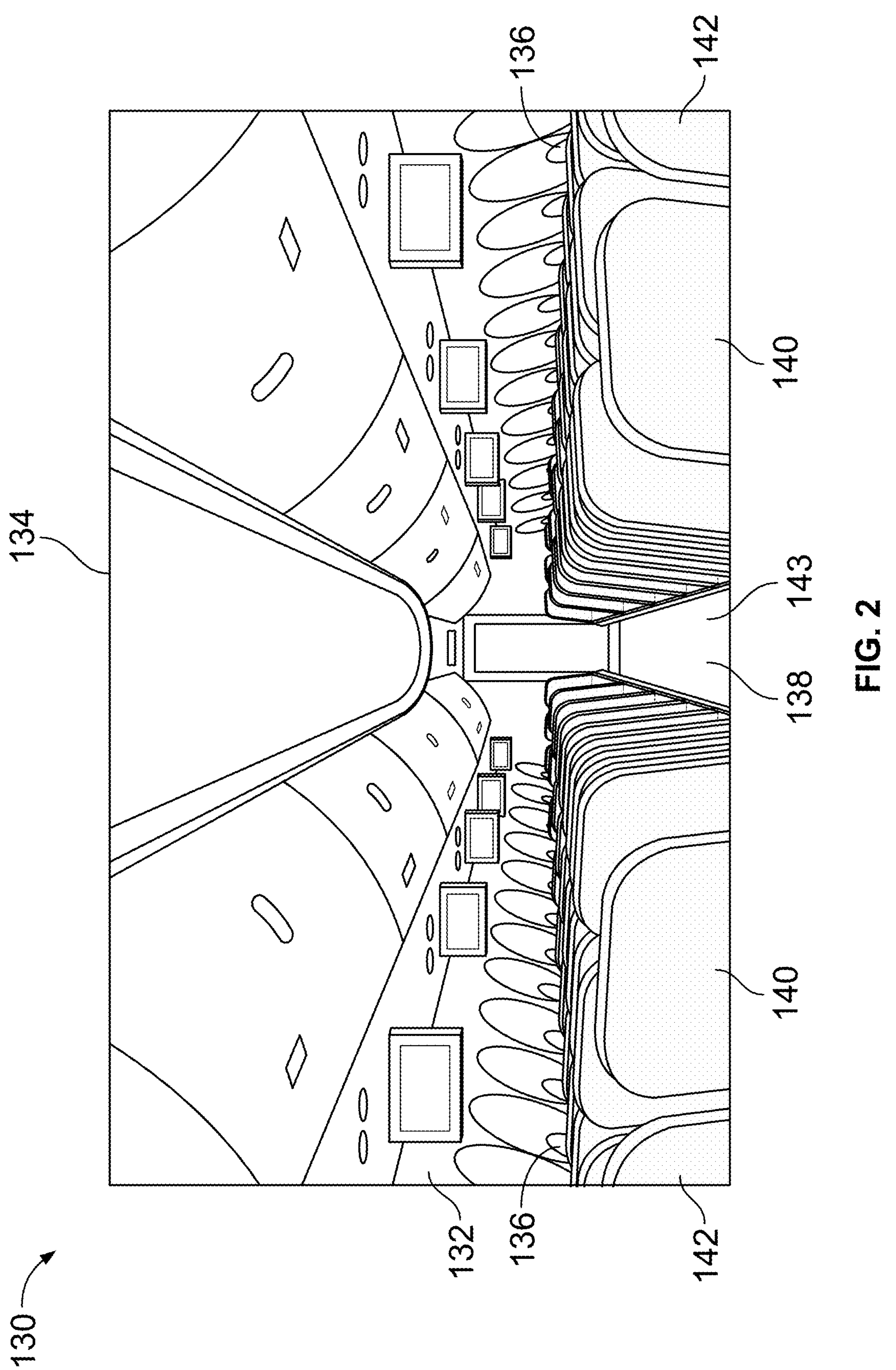
FIG. 2 illustrates a perspective interior view of an internal cabin of an aircraft, according to an example of the present disclosure.

FIG. 2 illustrates a perspective interior view of an internal cabin 130 of an aircraft, according to an example of the present disclosure. The internal cabin 130 includes outboard walls 132 and a ceiling 134. Windows 136 may be formed within the outboard walls 132. A floor 138 supports rows of seats 140, which are secured to seat tracks (not shown in FIG. 2). As shown in FIG. 2, a row 142 may include three seats 140 on either side of an aisle 143. However, the row 142 may include more or less seats 140 than shown. Additionally, the internal cabin 130 may include more aisles than shown.

As described herein, examples of the present disclosure provide systems and methods for securing seat assemblies (such as a flight attendant seat assembly or a passenger seat assembly) to parallel seat tracks. The systems and methods described herein include an intercostal that allows for a seat assembly to be laterally shifted in relation to the seat tracks.

Figures 3, 4:
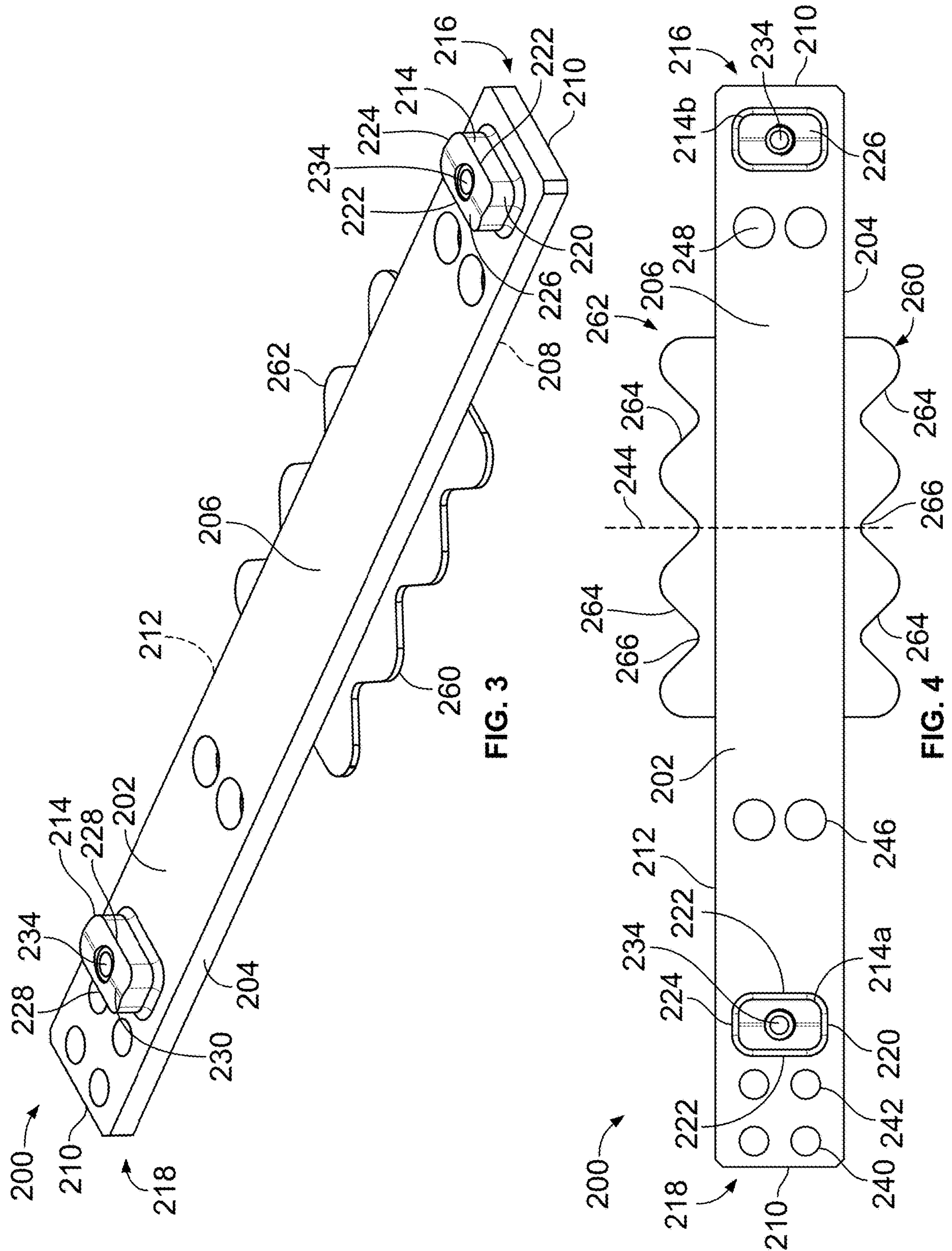
FIG. 3 illustrates an isometric top view of an intercostal, according to an example of the present disclosure.
FIG. 4 illustrates a top view of the intercostal of FIG. 3.
Figures 5, 6, 7:
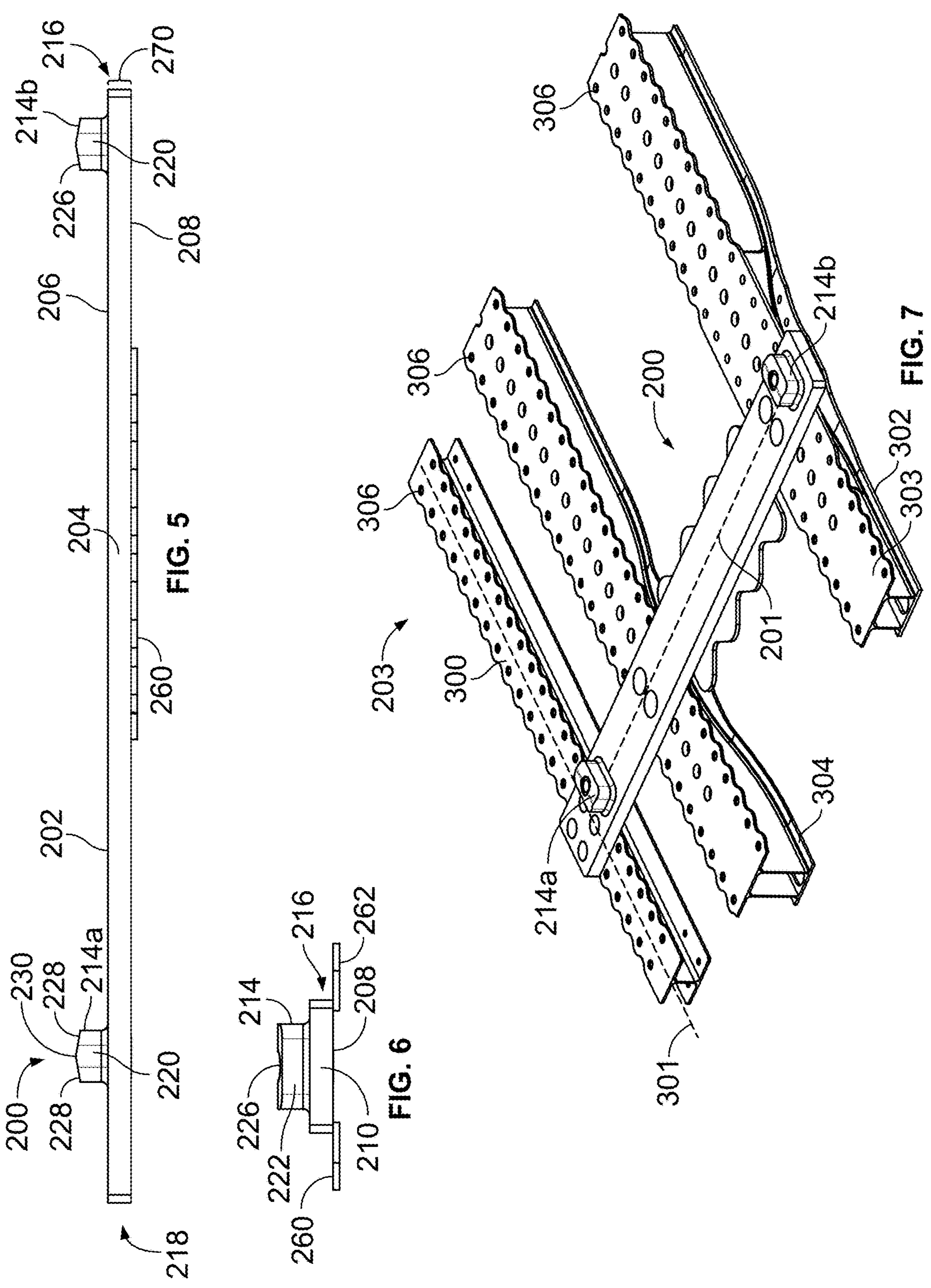
FIG. 5 illustrates a front view of the intercostal of FIG. 3.
FIG. 6 illustrates an end view of the intercostal of FIG. 3.
FIG. 7 illustrates an isometric top view of the intercostal of FIG. 3 secured to seat tracks, according to an example of the present disclosure.

FIG. 3 illustrates an isometric top view of an intercostal 200, according to an example of the present disclosure. FIG. 4 illustrates a top view of the intercostal 200 of FIG. 3. FIG. 5 illustrates a front view of the intercostal 200 of FIG. 3. FIG. 6 illustrates an end view of the intercostal 200 of FIG. 3. Referring to FIGS. 4-6, the intercostal includes a main beam 202 having a front edge 204 connected to a top surface 206 and a bottom surface 208 opposite from the top surface 206. The top surface 206 and the bottom surface 208 also connect to lateral edges 210, and a rear edge 212 opposite from the front edge 204.

An attachment boss 214 upwardly extends from the top surface 206 proximate to (such as within six inches or less) each end 216 and 218 of the main beam 202. Each attachment boss 214 is sized and shaped to fit within a reciprocal opening of a foot of a base of a seat assembly (such as a flight attendant seat assembly). The attachment boss 214 is a protuberance having a front wall 220 connected to side walls 222, which in turn connects to a rear wall 224. A top wall 226 connects to the front wall 220, the side walls 22, and the rear wall 224. In at least one example, the top wall 226 includes angled surface 228 that connect at a central apex 230, thereby forming an angled roof structure, which provides flexibility between the seat assembly and the seat track during an aircraft evacuation situation. Alternatively, the top wall 226 can be flat.

As shown, an attachment boss 214*a* is proximate to the end 218 of the main beam 202, and an attachment boss 214*b* is proximate to the end 216 of the main beam 202. The ends 216 and 218 are opposite from one another. Optionally, one or more additional attachment bosses can extend upwardly from the main beam 202 in order to provide additional mounting positions.

A channel 234 is formed through the attachment boss 214. In particular, the channel 234 extends into and through the top surface 206, and can extend into a height of the attachment boss 214. Optionally, the channel 234 can extend into and through the main beam 202, as well. In at least one example, internal surfaces of the attachment boss 214 that define the channel 234 can be threaded to threadably retain an outer threaded surface of a bushing, which is configured to be received and retained within the channel. Optionally, the internal surfaces may not be threaded, and the bushing can be secured within the channel, such as through adhesives, for example.

The main beam 202 can include a first pair of passages 240 and a second pair of passages 242 outboard from the attachment boss 214*a*. The passages 240 are longitudinally spaced apart to align with reciprocal openings of a seat track. Similarly, the passages 242 are longitudinally spaced apart to align with reciprocal openings of the seat track. As shown, the passages 240 and 242 are outboard (that is, away from a central axis 244) from the attachment boss 214*a*. Optionally, instead of pairs, single passages 240 and/or 242 can be used.

The main beam 202 can include a third pair of passages 246 between the attachment boss 214*a* and the central axis 244. The passages 246 are also longitudinally spaced apart to align with reciprocal openings of a seat track. Optionally, instead of pairs, single passages 246 can be used.

The main beam 202 can include a fourth pair of passages 248 between the central axis 244 and the attachment boss 214*b*. The passages 248 are also longitudinally spaced apart to align with reciprocal openings of a seat track. As shown, the passages 248 are inboard (that is, closer to the central axis 244) from the attachment boss 214*b*. Optionally, instead of pairs, single passages 248 can be used.

The passages 240, 242, 246, and 248 extend through the main beam 202 from the top surface 206 to and through the bottom surface 208. The passages 240, 242, 246, and 248 are configured to receive and retain fasteners that are configured to secure the intercostal 200 to a seat track. The different pairs of passages 240, 242, 246, and 248 allow for different shifted positions of the attachment bosses 214 in relation to the seat tracks. For example, fasteners can extend through the passages 240 and 242 to secure the intercostal 200 to a first seat track, while the passages 248 can receive fasteners that secure the intercostal to a second seat track, with the attachment bosses 214*a* and 214*b* shifted away from a top surface of the seat tracks. If the attachment bosses 214*a* and 214*b* are to be further shifted away from the seat tracks, the intercostal 200 can be further shifted, such that only the passages 240 align with reciprocal openings of the first seat track, while the passages 248 align with other openings of the other seat track. The main beam 202 can include additional pairs of passages to provide additional options for positioning. Optionally, the main beam 202 can include fewer pairs of passages than shown. For example, the main beam 202 can include only the passages 240 and the passages 248.

The intercostal 200 also includes a first panel support 260 extending forwardly from the bottom surface 208, and a second panel support 262 extending rearwardly from the bottom surface 208. Each of the first panel support 260 and the second panel support 262 includes planar teeth 264 and divots 266. The teeth 264 are flat and parallel with the bottom surface 208 and the top surface 206. In at least one example, an upper surface of the teeth 264 can be coplanar with the bottom surface 208. Optionally, the first panel support 260 and the second panel support 262 can be contiguous planar straps without any divots. Each of the first panel support 260 and the second panel support 262 is configured to support an edge of a floor panel. For example, a bottom surface of an edge of a floor panel is configured to rest on the first panel support 260 (or the second panel support 262). The thickness 270 of the main beam 202 is selected such that top surfaces of floor panel (which is supported on the first panel support 260 and the second panel support 262) are flush with the top surface 206 of the main beam 202, thereby providing a smooth interface, non-obtrusive interface between the floor panels and the intercostal 200. Optionally, the top surface of the floor panel can be below or above the top surface 206. Also, optionally, the intercostal 200 may include only the first panel support 260 or the second panel support 262. Also, optionally, panel supports can extend laterally below the front edge 204, the lateral edges 210, and/or the rear edge 212. Alternatively, the intercostal 200 may not include any panel support.

FIG. 7 illustrates an isometric top view of the intercostal 200 of FIG. 3 secured to seat tracks, according to an example of the present disclosure. As shown, the intercostal 200 spans between a first seat track 300 and a second track 302, which is parallel to the first seat track 300. A third seat track 304 can be disposed between the first seat track 300 and the second seat track 302. Optionally, the third seat track 304 may not be present.

The intercostal 200 connects to, and spans between the seat tracks 300 and 302 (and optionally the seat track 304). In at least one example, the intercostal 200 is perpendicular to the seat tracks 300 and 302. That is, the intercostal 200 has a longitudinal axis 201 that is perpendicular to parallel axes 301 and 303 of the seat tracks 300 and 302, respectively.

Each of the seat tracks 300, 302, and 304 include openings 306. Referring to FIGS. 3-7, the passages 240, 242, 246, and 248 of each pair are sized, shaped, and spaced to align with a reciprocal pair of the openings 306. Fasteners extend through the passages 240, 242, 246, and/or 248 and with the aligned reciprocal openings 306 to allow the intercostal 200 to be secured to the first seat track 300 and the second track 302 (and optionally, the third seat track 304).

The attachment bosses 214 are offset from the passages 240, 242, 246, and 248. That is, the attachment bosses 214 are not aligned on or over the passages 240, 242, 246, and 248. The attachment bosses 214 are configured to secure to feet of a base of a seat assembly (such as a flight attendant seat assembly). Because the attachment bosses 214 are offset from the passages 240, 242, 246, and 248, the intercostal 200 secures the seat assembly to the seat tracks 300 and 302 such that the feet of the base of the seat assembly are not disposed over the openings 306, nor do fasteners of fittings coupled to the feet extend into the openings 306. In this manner, the seat assembly can be shifted in relation to the seat tracks 300 and 302 by the intercostal 200.

As described herein, a system 203 includes the intercostal 200, which is configured to secure to two or more seat tracks (such as the seat tracks 300, 302, and/or 304). The seat tracks are spaced apart from one another. The intercostal 200 includes one or more attachment bosses 214 configured to secure to one or more feet of a base of a seat assembly.

Figure 8:
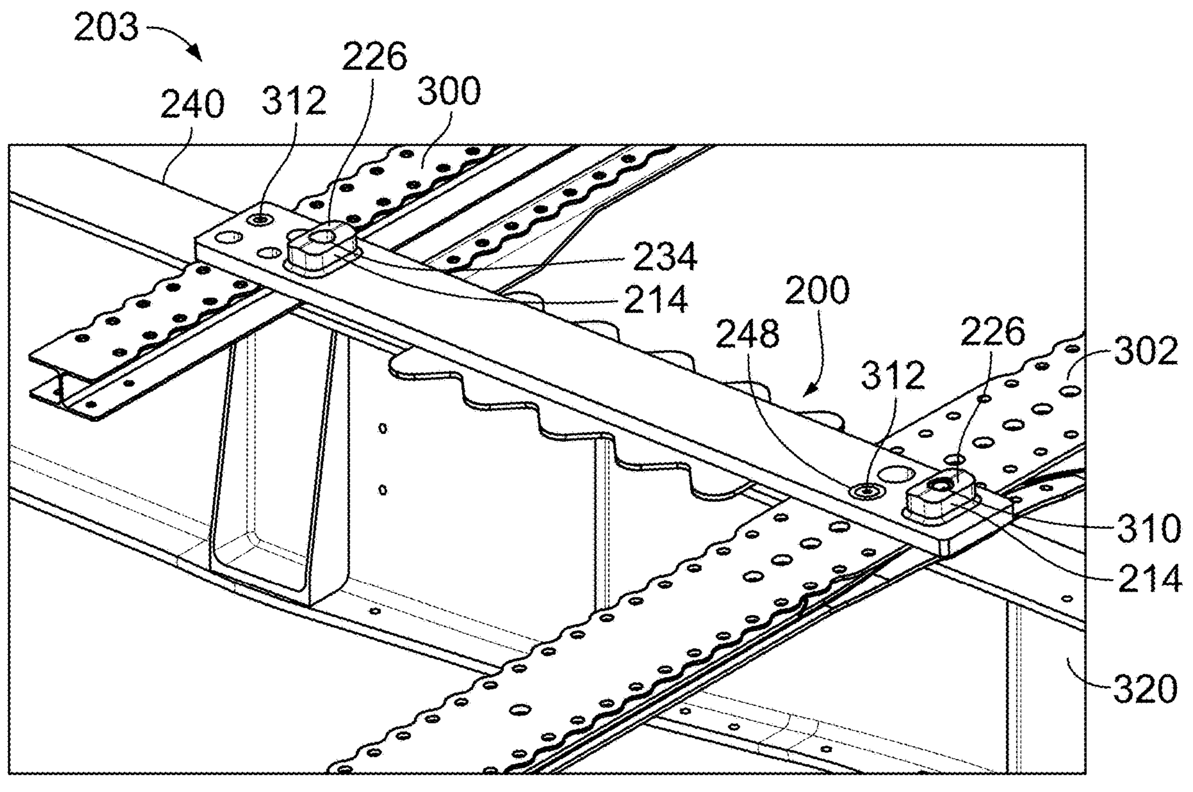
FIG. 8 illustrates an isometric top view of an intercostal secured to seat tracks, according to an example of the present disclosure.

FIG. 8 illustrates an isometric top view of an intercostal 200 secured to seat tracks 300 and 302, according to an example of the present disclosure. As shown in FIG. 8, the top walls 226 of the attachment bosses 214 can be flat. Referring to FIGS. 3-8, a threaded bushing 310 (including threads on an internal circumference to threadably retain a fastener, and optionally threads on an external circumference to threadably secured to the attachment boss 214) is received and retained within the channel 234 of each of the attachment bosses 214. Fasteners 312 are used to secure the intercostal 200 to the parallel seat tracks 300 and 302, such as by extending into passages 240 and 248, and aligned openings formed in the seat tracks 300 and 302. The seat tracks 300 and 302 are supported on a floor beam 320, which can be perpendicular to the seat tracks 300 and 302.

Figure 9:
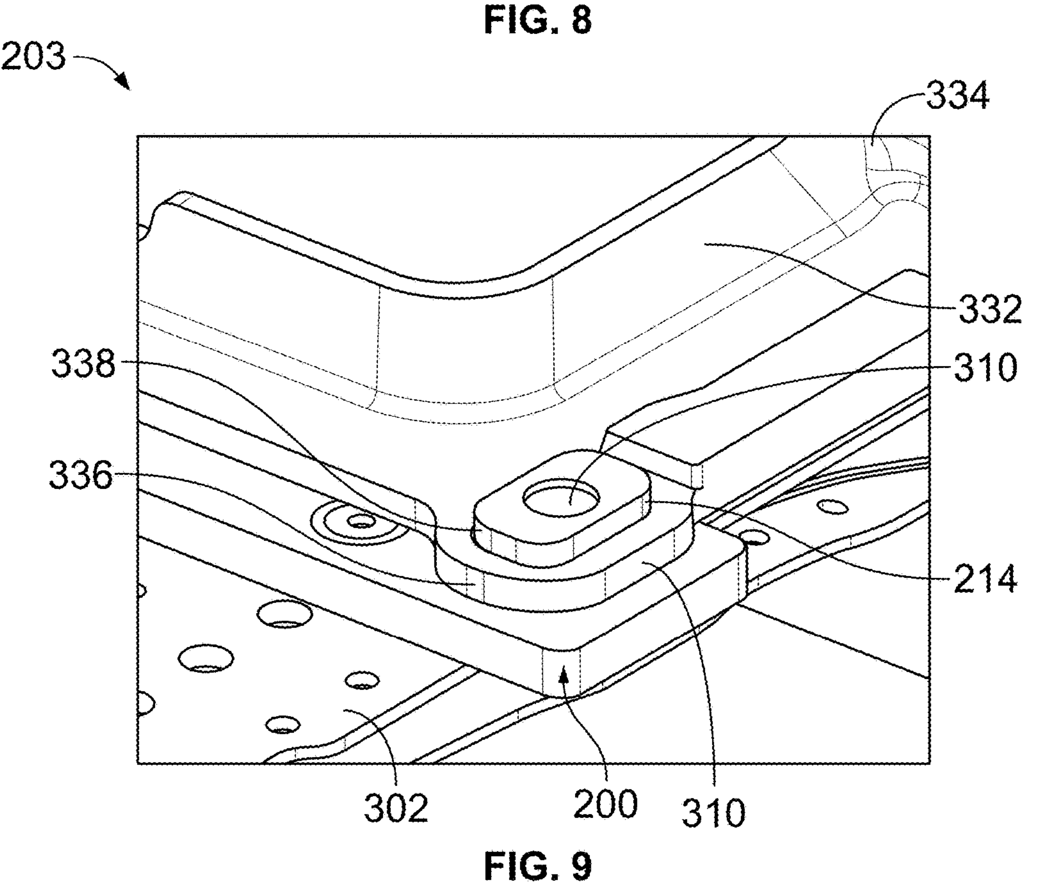
FIG. 9 illustrates an isometric top view of a foot of a base of a seat assembly secured around an attachment boss, according to an example of the present disclosure.

FIG. 9 illustrates an isometric top view of a foot 330 of a base 332 of a seat assembly 334 secured around an attachment boss 214, according to an example of the present disclosure. In at least one example, the seat assembly 334 is a flight attendant seat assembly. The base 332 can include two front feet 330, and two rear feet (not shown in FIG. 9). Optionally, the seat assembly 334 can include the two front feet 330, and a rear portion secured to a wall of a monument within an internal cabin. Also, optionally, the seat assembly 334 can be a passenger seat, instead of a flight attendant seat assembly.

As shown, each foot 330 includes a collar 336 defining a retaining channel 338. The outer perimeter of the attachment boss 214 is sized and shaped to conform to the retaining channel 338. For example, the attachment boss 214 can fit within the retaining channel 338 via an interference fit, or a clearance fit within appropriate tolerance.

Figure 10:
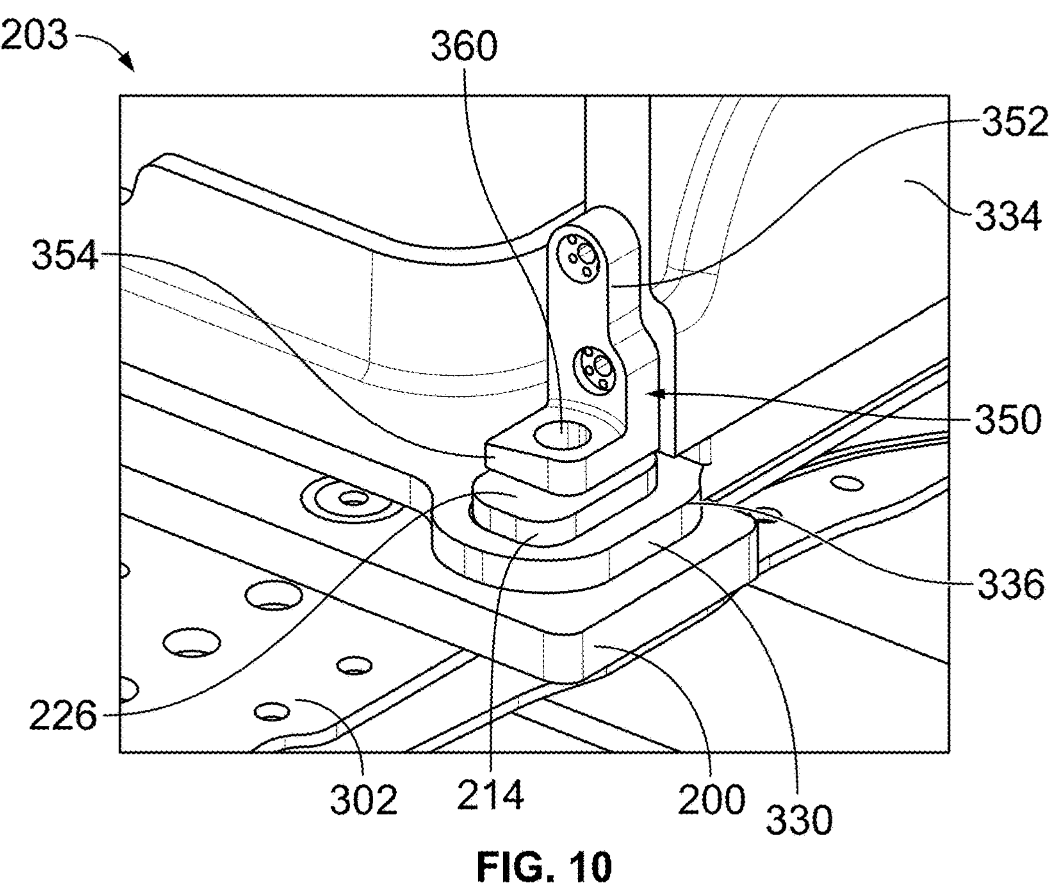
FIG. 10 illustrates an isometric top view of a securing bracket of the seat assembly coupled to the attachment boss, according to an example of the present disclosure.

FIG. 10 illustrates an isometric top view of a securing bracket 350 of the seat assembly 334 coupled to the attachment boss 214, according to an example of the present disclosure. The securing bracket 350 includes an upper beam 352 that secures to a front portion of the base 332 (such as through one or more fasteners and/or adhesives), and a lower tab 354, which can be perpendicular to the upper beam 352, and extends over at least a portion of the top wall 226 of the attachment boss 214. The lower tab 354 includes a passage 360 that is axially aligned with the bushing 310 (shown in FIGS. 8 and 9) of the attachment boss 214.

Figure 11:
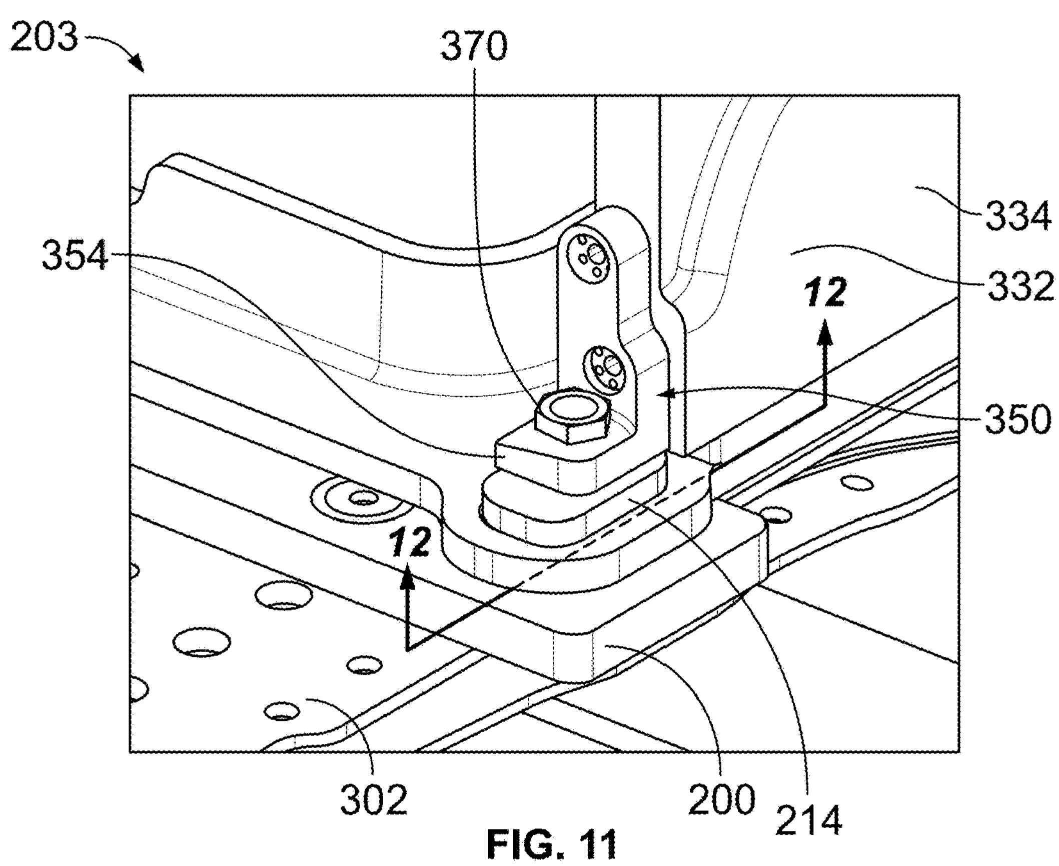
FIG. 11 illustrates an isometric top view of a fastener securing the seat assembly to the attachment boss, according to an example of the present disclosure.
Figure 12:
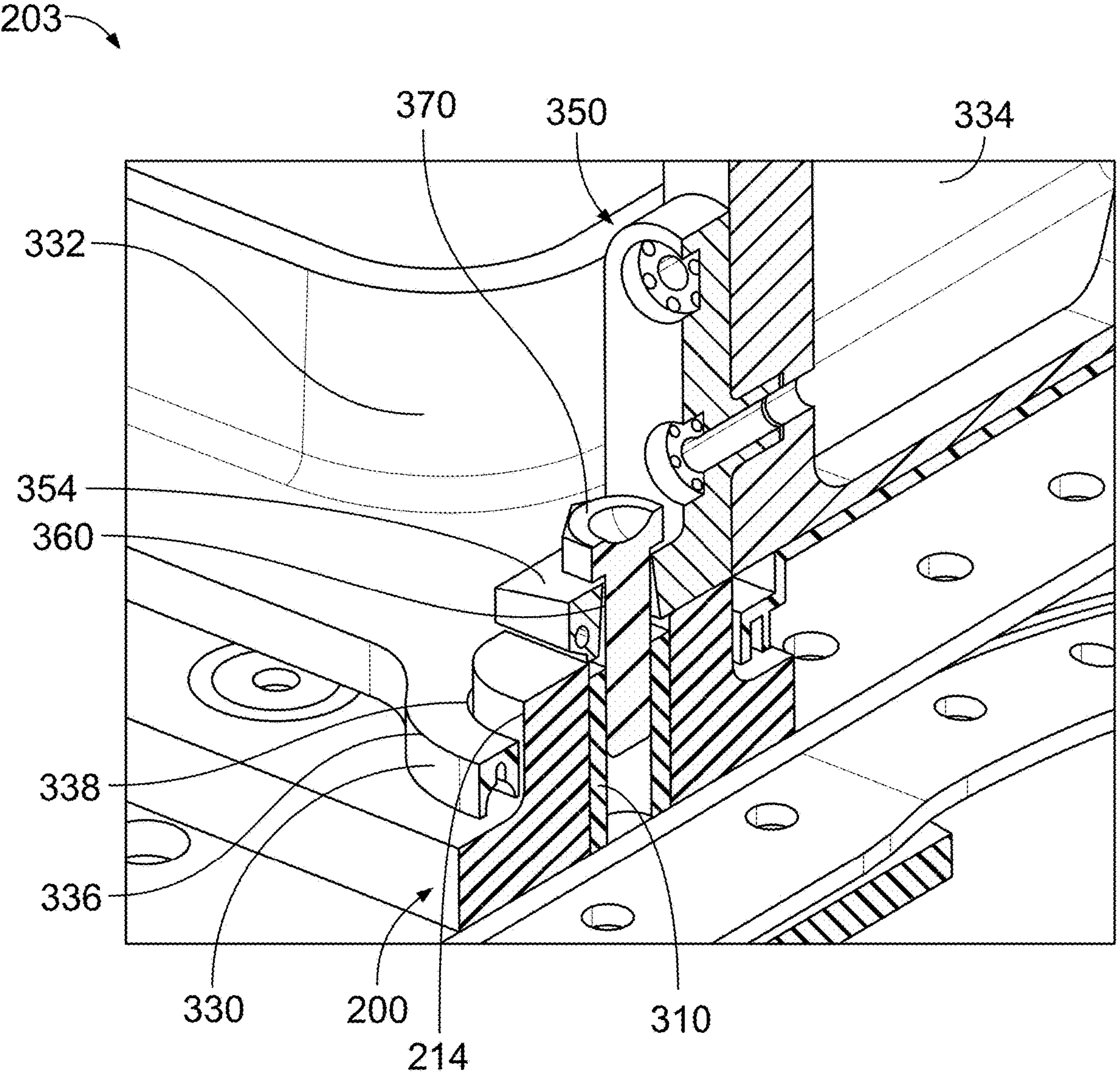
FIG. 12 illustrates an isometric cross-sectional view of the intercostal secured to the seat assembly, according to an example of the present disclosure.

FIG. 11 illustrates an isometric top view of a fastener 370 (such as a threaded bolt) securing the seat assembly 334 to the attachment boss 214, according to an example of the present disclosure. FIG. 12 illustrates an isometric cross-sectional view of the intercostal 200 secured to the seat assembly 334, according to an example of the present disclosure. Referring to FIGS. 8-12, the fastener 370 passes into the passage 360 of the lower tab 354, and threadably engages the bushing 310. In this manner, the fastener 370 secures the seat assembly 334 to the intercostal 200. Because the bushing 310 can be threaded, the fastener 370 secures to the attachment boss 214 without the use of a nut, which can be advantageous in areas where access to an underside of the intercostal 200 is limited. Alternatively, the bushing 310 may not be threaded, and the fastener can have a portion extending through the attachment boss 214 and an underside of the intercostal 200. A nut can then be coupled to an exposed end of a shaft of the fastener.

Figure 13:
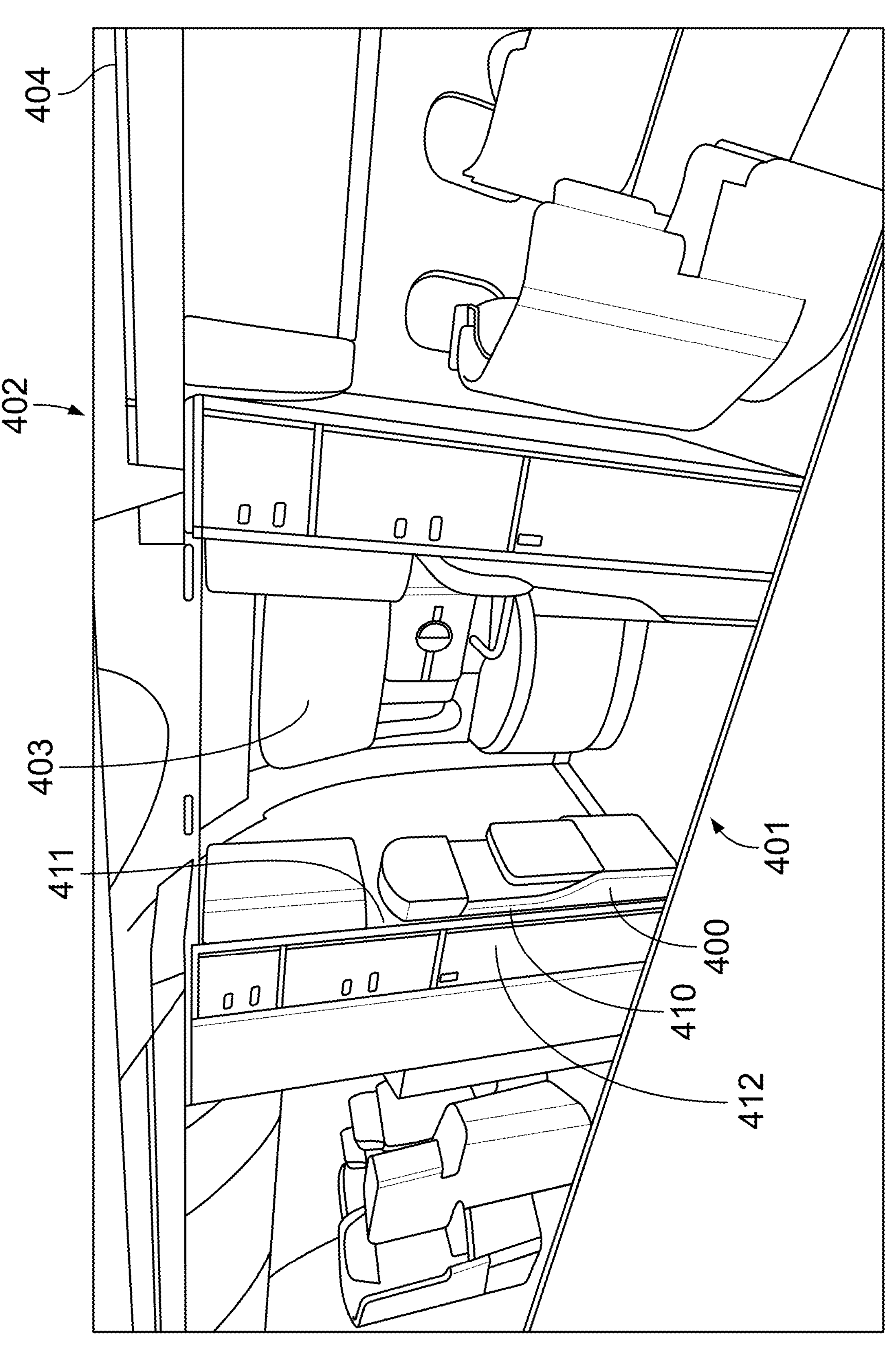
FIG. 13 illustrates an isometric view of a flight attendant seat assembly within an internal cabin of an aircraft, according to an example of the present disclosure.

FIG. 13 illustrates an isometric view of a flight attendant seat assembly 400 within an internal cabin 402 of an aircraft 404, according to an example of the present disclosure. The flight attendant seat assembly 400 is an example of the seat assembly 334 (shown in FIGS. 9-12). The flight attendant seat assembly 400 can be disposed within a cross-aisle 401 that leads to an egress door 403.

Referring to FIGS. 3-13, the flight attendant seat assembly 400 includes two forward feet 330 secured to attachment bosses 214 of an intercostal 200, which secures to parallel seat tracks (such as the seat tracks 300 and 302). A rear portion 410 of the flight attendant seat assembly 400 can be secured to a wall 411 of a monument 412 within the internal cabin 402. The intercostal 200 spans between the parallel seat tracks, and allows for the flight attendant seat assembly 400 to be offset (for example, laterally shifted away from top surface of) of the seat tracks.

As described herein, the intercostal 200 is configured to be secured to parallel seat tracks (such as the seat tracks 300 and 302), and includes attachment bosses 214 configured to secure to feet of a seat assembly. The intercostal 200 allows for the seat assembly to be laterally shifted in relation to the seat tracks to a desired position.

Figure 14:
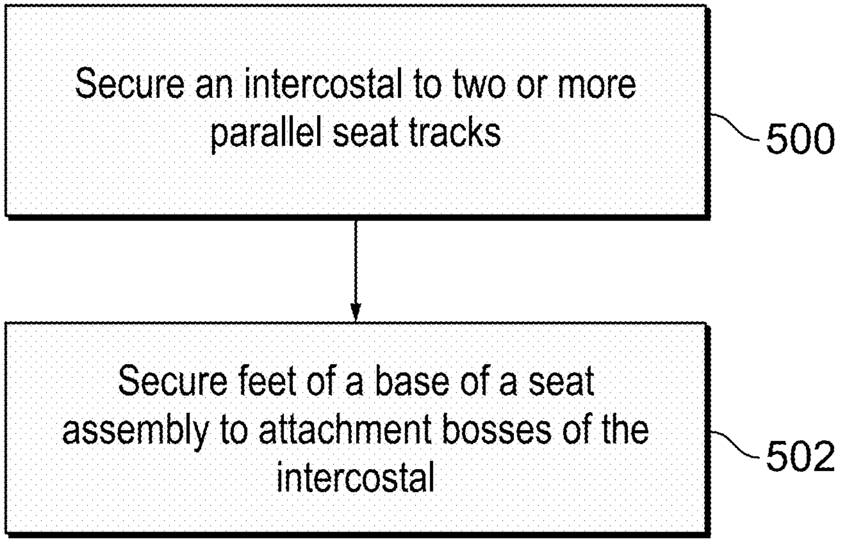
FIG. 14 illustrates a flow chart of a method, according to an example of the present disclosure.

FIG. 14 illustrates a flow chart of a method, according to an example of the present disclosure. Referring to FIGS. 3-14, at 500, an intercostal 200 is secured to two or more parallel seat tracks (such as the seat tracks 300 and 302). At 502, one or more feet 330 of a base 332 of a seat assembly 334 are secured to one or more attachment bosses 214 of the intercostal 200.

Further, the disclosure comprises examples according to the following clauses:

Clause 1. A system comprising:

- an intercostal configured to secure to a first seat track and a second seat track, wherein the intercostal comprises one or more attachment bosses configured to secure to one or more feet of a base of a seat assembly.

Clause 2. The system of Clause 1, wherein the seat assembly is a flight attendant seat assembly within an internal cabin of an aircraft.

Clause 3. The system of Clauses 1 or 2, wherein the one or more attachment bosses comprise:

- a first attachment boss proximate to a first end of a main beam of the intercostal; and
- a second attachment boss proximate to a second end of the main beam of the intercostal, wherein the first end is opposite from the second end.

Clause 4. The system of any of Clauses 1-3, wherein the one or more attachment bosses comprise a channel, and wherein a bushing is retained within the channel.

Clause 5. The system of Clause 4, wherein the bushing is configured to threadably retain a fastener.

Clause 6. The system of any of Clauses 1-5, wherein the intercostal further comprises:

- one more first passages configured to align with one or more first openings of the first seat track, wherein one or more first fasteners are configured to extend through the one or more first passages and the one or more openings to secure the intercostal to the first seat track; and
- one or more second passages configured to align with one or more second openings of the second seat track, wherein one or more second fasteners are configured to extend through the one or more second passages and the one or more second openings to secure the intercostal to the first seat track.

Clause 7. The system of Clause 6, wherein the one or more attachment bosses are offset from the one or more first passages and the one or more second passages.

Clause 8. The system of Clauses 6 or 7, wherein the intercostal further comprises one or more third passages configured to align with the one or more first openings or one or more third openings of the first seat track.

Clause 9. The system of any of Clauses 1-8, wherein the intercostal further comprises one or more panel supports extending outwardly from a lower surface of a main beam.

Clause 10. The system of Clause 9, wherein the one or more panel supports comprise:

a first panel support extending forwardly from the lower surface; and a second panel support extending rearwardly from the lower surface.

Clause 11. The system of Clause 9, where an upper surface of one or both of the first panel support or the second panel support are aligned with upper surfaces of the seat tracks.

Clause 12. The system of any of Clauses 1-11, wherein the one or more attachment bosses are configured to be retained within a retaining channel of a collar of the one or more feet.

Clause 13. The system of Clause 12, wherein the seat assembly comprises one or more securing brackets that are configured to be fastened to the one or more attachment bosses.

Clause 14. A method comprising:

securing an intercostal to a first seat track and a second seat track; and securing one or more feet of a base of a seat assembly to one or more attachment bosses of the intercostal.

Clause 15. An aircraft comprising:

an internal cabin having a first seat track and a second seat track on a floor;

an intercostal secured to the first seat track and the second seat track, wherein the intercostal comprises one or more attachment bosses; and a flight attendant seat assembly including a base having one or more feet, wherein the one or more feet are secured to the one or more attachment bosses.

Clause 16. The aircraft of Clause 16, wherein the one or more attachment bosses comprises:

a first attachment boss proximate to a first end of a main beam of the intercostal; and a second attachment boss proximate to a second end of the main beam of the intercostal, wherein the first end is opposite from the second end.

Clause 17. The aircraft of Clauses 15 or 16, wherein the one or more attachment bosses comprise a channel, and wherein a bushing is retained within the channel, wherein the bushing is configured to threadably retain a fastener.

Clause 18. The aircraft of any of Clauses 15-17, wherein the intercostal further comprises:

one more first passages aligned with one or more first openings of the first seat track, wherein one or more first fasteners extend through the one or more first passages and the one or more openings to secure the intercostal to the first seat track; and one or more second passages aligned with one or more second openings of the second seat track, wherein one or more second fasteners extend through the one or more second passages and the one or more second openings to secure the intercostal to the first seat track, wherein the one or more attachment bosses are offset from the one or more first passages and the one or more second passages.

Clause 19. The aircraft of any of Clauses 15-18, wherein the intercostal further comprises:

a first panel support extending forwardly from a lower surface of a main beam; and a second panel support extending rearwardly from the lower surface of the main beam.

Clause 20. The aircraft of any of Clauses 15-19, wherein the one or more attachment bosses are retained within a retaining channel of a collar of the one or more feet.

Clause 21. The aircraft of Clause 20, wherein the flight attendant seat assembly further comprises one or more securing brackets fastened to the one or more attachment bosses.

As described herein, examples of the present disclosure provide effective and efficient systems and methods for securing a seat assembly within an internal cabin of a vehicle, such as a commercial aircraft. Further, examples of the present disclosure provide systems and methods for allowing seat assemblies, such as flight attendant seat assemblies, to be efficiently shifted away from existing seat tracks. Also, examples of the present disclosure provide less complex systems and methods for securing a fitting of a flight attendant seat assembly to a seat track. Also, examples of the present disclosure provide systems and methods for securing a flight attendant seat assembly to seat tracks with little or no need for re-designing the flight attendant seat assembly (which, in turn, reduces the need for costly re-design, testing, and certification).

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

an intercostal configured to secure to a first seat track and a second seat track, wherein the intercostal comprises one or more attachment bosses configured to secure to one or more feet of a base of a seat assembly, and wherein the one or more attachment bosses are configured to be retained within a retaining channel of a collar of the one or more feet.

2. The system of claim 1, wherein the seat assembly is a flight attendant seat assembly within an internal cabin of an aircraft.

3. The system of claim 1, wherein the one or more attachment bosses comprise:

a first attachment boss proximate to a first end of a main beam of the intercostal; and a second attachment boss proximate to a second end of the main beam of the intercostal, wherein the first end is opposite from the second end.

4. The system of claim 1, wherein the one or more attachment bosses comprise a channel, and wherein a bushing is retained within the channel.

5. The system of claim 4, wherein the bushing is configured to threadably retain a fastener.

6. The system of claim 1, wherein the intercostal further comprises:

one more first passages configured to align with one or more first openings of the first seat track, wherein one or more first fasteners are configured to extend through the one or more first passages and the one or more openings to secure the intercostal to the first seat track; and one or more second passages configured to align with one or more second openings of the second seat track, wherein one or more second fasteners are configured to extend through the one or more second passages and the one or more second openings to secure the intercostal to the first seat track.

7. The system of claim 6, wherein the one or more attachment bosses are offset from the one or more first passages and the one or more second passages.

8. The system of claim 6, wherein the intercostal further comprises one or more third passages configured to align with the one or more first openings or one or more third openings of the first seat track.

9. The system of claim 1, wherein the intercostal further comprises one or more panel supports extending outwardly from a lower surface of a main beam.

10. The system of claim 9, wherein the one or more panel supports comprise:

a first panel support extending forwardly from the lower surface; and a second panel support extending rearwardly from the lower surface.

11. The system of claim 1, wherein the seat assembly comprises one or more securing brackets that are configured to be fastened to the one or more attachment bosses.

12. An aircraft comprising:

an internal cabin having a first seat track and a second seat track on a floor;

an intercostal secured to the first seat track and the second seat track, wherein the intercostal comprises one or more attachment bosses; and a flight attendant seat assembly including a base having one or more feet, wherein the one or more feet are secured to the one or more attachment bosses, and wherein the one or more attachment bosses are retained within a retaining channel of a collar of the one or more feet.

13. The aircraft of claim 12, wherein the one or more attachment bosses comprises:

a first attachment boss proximate to a first end of a main beam of the intercostal; and a second attachment boss proximate to a second end of the main beam of the intercostal, wherein the first end is opposite from the second end.

14. The aircraft of claim 12, wherein the one or more attachment bosses comprise a channel, and wherein a bushing is retained within the channel, wherein the bushing is configured to threadably retain a fastener.

15. The aircraft of claim 12, wherein the intercostal further comprises:

one more first passages aligned with one or more first openings of the first seat track, wherein one or more first fasteners extend through the one or more first passages and the one or more openings to secure the intercostal to the first seat track; and one or more second passages aligned with one or more second openings of the second seat track, wherein one or more second fasteners extend through the one or more second passages and the one or more second openings to secure the intercostal to the first seat track, wherein the one or more attachment bosses are offset from the one or more first passages and the one or more second passages.

16. The aircraft of claim 12, wherein the intercostal further comprises:

a first panel support extending forwardly from a lower surface of a main beam; and a second panel support extending rearwardly from the lower surface of the main beam.

17. The aircraft of claim 12, wherein the flight attendant seat assembly further comprises one or more securing brackets fastened to the one or more attachment bosses.

18. A system comprising:

an intercostal configured to secure to a first seat track and a second seat track, wherein the intercostal comprises:

one or more attachment bosses configured to secure to one or more feet of a base of a seat assembly;

one more first passages configured to align with one or more first openings of the first seat track, wherein one or more first fasteners are configured to extend through the one or more first passages and the one or more openings to secure the intercostal to the first seat track; and one or more second passages configured to align with one or more second openings of the second seat track, wherein one or more second fasteners are configured to extend through the one or more second passages and the one or more second openings to secure the intercostal to the first seat track, and wherein the one or more attachment bosses are offset from the one or more first passages and the one or more second passages.

19. The system of claim 18, wherein the seat assembly is a flight attendant seat assembly within an internal cabin of an aircraft, and wherein the one or more attachment bosses are configured to be retained within a retaining channel of a collar of the one or more feet.

20. The system of claim 19, wherein the one or more attachment bosses comprise a channel, wherein a bushing is retained within the channel, and wherein the bushing is configured to threadably retain a fastener.

* * * * *